US012643599B2

(12) United States Patent
Strecker

(10) Patent No.: US 12,643,599 B2
(45) Date of Patent: Jun. 2, 2026

(54) APPARATUS AND METHOD FOR DAMPING A STEERING MOVEMENT IN AN ACTIVE STEERING SYSTEM OF A VEHICLE AND A VEHICLE COMPRISING SAID APPARATUS

(71) Applicant: Robert Bosch GmbH, Stuttgart (DE)

(72) Inventor: Joerg Strecker, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 18/390,024

(22) Filed: Dec. 20, 2023

(65) Prior Publication Data
US 2024/0300575 A1    Sep. 12, 2024

(30) Foreign Application Priority Data
Mar. 10, 2023    (DE) ..................... 10 2023 202 152.8

(51) Int. Cl.
| | |
|---|---|
| *B62D 6/00* | (2006.01) |
| *B62D 5/00* | (2006.01) |
| *B62D 5/04* | (2006.01) |
| *B62D 6/04* | (2006.01) |

(52) U.S. Cl.
CPC ............. *B62D 6/008* (2013.01); *B62D 5/001* (2013.01); *B62D 5/046* (2013.01); *B62D 5/0463* (2013.01); *B62D 6/001* (2013.01); *B62D 6/04* (2013.01); *B62D 5/0472* (2013.01)

(58) Field of Classification Search
None
See application file for complete search history.

(56) References Cited

U.S. PATENT DOCUMENTS

| | | | | |
|---|---|---|---|---|
| 7,565,946 B2 * | 7/2009 | Suzumura | .............. | B62D 6/003 |
| | | | | 701/41 |
| 8,249,777 B2 * | 8/2012 | Greul | ..................... | B62D 6/008 |
| | | | | 701/41 |
| 8,977,433 B2 * | 3/2015 | Kojima | .................. | B62D 5/049 |
| | | | | 701/41 |
| 9,463,827 B2 * | 10/2016 | Mose | ................... | B62D 5/0463 |
| 9,669,866 B2 * | 6/2017 | Kunihiro | .............. | B62D 5/0481 |
| 10,053,144 B2 * | 8/2018 | Dornhege | .............. | B62D 6/002 |
| 10,214,238 B2 * | 2/2019 | Wijffels | ............... | B62D 15/025 |
| 11,407,446 B2 * | 8/2022 | Strecker | ................. | B62D 5/006 |
| 11,472,475 B2 * | 10/2022 | Lee | ......................... | B62D 6/008 |
| 11,603,125 B2 * | 3/2023 | Kim | ........................ | G01L 5/221 |

(Continued)

FOREIGN PATENT DOCUMENTS

| | | | | | |
|---|---|---|---|---|---|
| CN | 109484470 A | * | 3/2019 | .......... | B62D 5/0463 |
| CN | 117901941 A | * | 4/2024 | ............. | B62D 6/008 |

(Continued)

*Primary Examiner* — Kevin R Steckbauer
(74) *Attorney, Agent, or Firm* — Maginot, Moore & Beck LLP

(57)    ABSTRACT

Apparatus and method for damping a steering movement in an active steering system of a vehicle, wherein a variable is determined which characterizes a force acting from outside the vehicle on the steering movement of the active steering system or a moment acting from outside the vehicle on the steering movement of the active steering system that has an accelerating effect on the steering movement of the steering system. The speed of the steering movement is limited as a function of the variable. Vehicle comprising said apparatus.

12 Claims, 5 Drawing Sheets

(56) References Cited

U.S. PATENT DOCUMENTS

| | | | | |
|---|---|---|---|---|
| 2006/0080016 A1* | 4/2006 | Kasahara | .............. | B62D 6/008 |
| | | | | 701/41 |
| 2007/0095604 A1* | 5/2007 | Suzumura | ............. | B62D 6/003 |
| | | | | 180/402 |
| 2012/0072074 A1* | 3/2012 | Greul | .................... | B62D 6/008 |
| | | | | 701/41 |
| 2012/0303218 A1* | 11/2012 | Tamura | ................. | B62D 1/046 |
| | | | | 701/41 |
| 2013/0261894 A1* | 10/2013 | Kojima | ................... | B62D 6/00 |
| | | | | 701/41 |
| 2014/0222295 A1* | 8/2014 | Dornhege | ............. | B62D 6/002 |
| | | | | 701/42 |
| 2015/0266504 A1* | 9/2015 | Kunihiro | ............. | B62D 5/0463 |
| | | | | 701/41 |
| 2016/0137221 A1* | 5/2016 | Mose | .................. | B62D 5/0463 |
| | | | | 701/41 |
| 2018/0127025 A1* | 5/2018 | Wijffels | ................ | B62D 5/008 |
| 2019/0176878 A1* | 6/2019 | Lee | .......................... | H02P 29/40 |
| 2020/0361531 A1* | 11/2020 | Strecker | ................. | B62D 5/006 |
| 2020/0391788 A1* | 12/2020 | Kim | ......................... | G01L 5/221 |
| 2023/0234640 A1* | 7/2023 | Strecker | ................ | B62D 6/008 |
| 2024/0286673 A1* | 8/2024 | Kamimae | ............. | B62D 6/008 |
| 2024/0300575 A1* | 9/2024 | Strecker | ................ | B62D 6/008 |

FOREIGN PATENT DOCUMENTS

| | | | | | |
|---|---|---|---|---|---|
| CN | 118618475 A | * | 9/2024 | ............... | B62D 6/04 |
| DE | 102018200094 A1 | * | 7/2019 | ............ | B62D 5/006 |
| DE | 102020206435 A1 | * | 11/2021 | ............ | B62D 6/008 |
| DE | 102023202152 A1 | * | 9/2024 | ............... | B62D 6/04 |
| EP | 2572964 A1 | * | 3/2013 | .......... | B62D 5/0484 |
| EP | 2572964 B1 | * | 5/2016 | .......... | B62D 5/0463 |
| ES | 2772749 T3 | * | 7/2020 | ............ | B60W 30/02 |
| JP | 2024128969 A | * | 9/2024 | ............... | B62D 6/04 |
| KR | 102634244 B1 | * | 2/2024 | .......... | B62D 5/0463 |
| WO | WO-2019134795 A1 | * | 7/2019 | ............ | B62D 6/008 |
| WO | WO-2021239275 A1 | * | 12/2021 | ............ | B62D 6/008 |

* cited by examiner

APPARATUS AND METHOD FOR DAMPING A STEERING MOVEMENT IN AN ACTIVE STEERING SYSTEM OF A VEHICLE AND A VEHICLE COMPRISING SAID APPARATUS

This application claims priority under 35 U.S.C. § 119 to application no. DE 10 2023 202 152.8, filed on Mar. 10, 2023 in Germany, the disclosure of which is incorporated herein by reference in its entirety.

BACKGROUND

The disclosure relates to an apparatus and a method for damping a steering movement in an active steering system of a vehicle and a vehicle comprising said apparatus.

In active steering systems, situations can arise in which a motor of the active steering system is no longer able to provide a desired moment and implement a desired behavior to support steering movements due to field weakening in the motor. In an electric power steering (EPS) system, this results in very high forces on the steering wheel and the ability of a driver to hold on to the steering wheel is limited. The steering wheel and the entire steering system thus continue to rotate, possibly until an end stop is reached, or until the dynamics or forces in the steering system are again in a range in which the motor can provide the desired moment. In a steer-by-wire (SbW) system, this behavior occurs at an actuator through which the steered wheels are moved. This means that a steered axle moves in relation to a desired target position toward or possibly up to the end stop, or until the dynamics or the forces in the steering system are again in a range in which the motor can provide the desired moment. For the driver, in an SbW system, this results in an unwanted vehicle movement based on their steering wheel angle.

SUMMARY

The method, the apparatus, and the vehicle according to the disclosure prevents a motor of the active steering system from being unable to provide a desired moment.

The term "active steering system" refers to a steering device of the vehicle in which a steering angle of the steered wheels is set by a mechatronic system. One example of the mechatronic system is a steer-by-wire (SbW) system, in which there is no mechanical connection between the steering wheel actuator (SWA) and the rack actuator (SRA). The rack actuator moves the steered wheels.

The method for damping a steering movement in an active steering system of a vehicle provides that a variable is determined, which characterizes a force acting from outside the vehicle on the steering movement of the active steering system or a moment acting from outside the vehicle on the steering movement of the active steering system that has an accelerating effect on the steering movement of the steering system, wherein the speed of the steering movement is limited as a function of the variable. In certain driving situations, the force acting from outside the vehicle has an accelerating effect on the steering movement. This can occur, for example, in maneuvers in which the force acting from outside is high and steered wheels or a steered axle of the vehicle move in accordance with this force. This means that a direction of force is initially the same as the direction of movement, in which case the force pushes the motor. Examples of this maneuver include steering when the vehicle is oversteering or when carrying out an evasive maneuver with the vehicle. These maneuvers are characterized by both a high force and high steering dynamics. To achieve these high steering dynamics, the motor usually works in the same direction as the force acting from outside at the start of the movement, i.e., the motor supports this movement. This means that, during an acceleration phase of the steering movement, the motor moment and the direction of movement in a motor operation usually go in the same direction. This acceleration phase is followed by a deceleration phase in which the steering movement is supposed to be reduced. In a regenerative operation, the motor moment now changes its direction and acts against the direction of movement and against the force acting from outside to reduce the steering dynamics. If the steering speed and the force acting from outside are correspondingly high, the damping of the steering movement prevents a maximum possible motor moment from no longer being sufficient to reduce the steering speed due to the field weakening of the motor. This prevents the steered wheels or the steered axle from behaving purely in response to the force acting from outside and continuing to move almost unbraked, possibly up to an end stop. This means that this prevents the motor from no longer being able to implement a desired behavior.

In one embodiment, a maximum change of a target steering position request is specified, wherein the speed of the steering movement is a function of the target steering position request, and wherein limiting the speed of the steering movement includes limiting the target steering position request to the maximum change.

In one embodiment, a maximum change of a target steering angle request is specified, wherein the speed of the steering movement is a function of the target steering angle request, and wherein limiting the speed of the steering movement includes limiting the target steering angle request to the maximum change.

Limiting the maximum change is preferably carried out on the basis of the force, in particular the scaled or modified force, wherein the maximum change decreases as the force increases, or limiting the maximum change is carried out on the basis of the moment, in particular the scaled or modified moment, wherein the maximum change decreases as the moment increases.

It is preferably provided that a distance of the target steering position request limited to the maximum change from an unlimited target steering position request or a distance of the target steering angle request limited to the maximum change from an unlimited target steering angle request is determined, wherein it is found that the distance is less than a threshold and, if the distance is less than the threshold, limiting the speed of the steering movement includes limiting to a change that is greater than the maximum change instead of limiting to the maximum change. This prevents jumps that might otherwise occur in a resulting target steering position request or target steering angle request.

It is preferably provided that the scaling of the variable that characterizes the force acting from outside or the moment acting from outside and/or the maximum change is carried out as a function of a motor power, a vehicle speed, a vehicle lateral acceleration, and/or the driving situation. This optimizes the limit depending on the situation.

It is preferably provided that scaling includes changing the variable or the maximum change with decreasing motor power, decreasing vehicle speed, or decreasing vehicle lateral acceleration. This provides an adaptation to a strength of the force acting from outside or a strength of the moment acting from outside.

It is preferably provided that, when the variable that characterizes the force acting from outside or the moment acting from outside increases in magnitude, scaling includes maintaining said variable, and/or, when the variable that characterizes the force acting from outside or the moment acting from outside decreases in magnitude, scaling includes limiting the variable, and/or, when the maximum change increases in magnitude, scaling includes maintaining said maximum change, and/or, when the maximum change decreases in magnitude, scaling includes limiting the maximum change. The variable or the maximum change thus follows the force when the force acting from outside increases or follows the moment when the moment acting from outside increases, and the adaptation to the strength occurs when the force acting from outside decreases or when the moment acting from outside decreases.

It is preferably provided that limiting the variable that characterizes the force acting from outside or the moment acting from outside provides limiting the variable with a first maximum change when the variable is greater than a threshold and provides limiting the variable with a second maximum change when the variable is less than or equal to the threshold. Limiting thus takes place with two different gradients.

When the driving situation is identified, feedback is preferably provided on the control element that a steering speed should be reduced. This communicates that a requested steering dynamic is not being implemented.

The target steering position request or the target steering angle request is preferably determined as a function of an angle specified by a person via a movement of a steering device, wherein feedback that the steering speed should be reduced is provided to the person by a counter-moment which counteracts said movement and is output via the steering device. This feedback is particularly easy to perceive by the person.

The apparatus, in particular an active steering system, provides that the apparatus comprises a device which is configured to acquire a variable that characterizes a force acting from outside on a steering movement of the active steering system or the moment acting from outside, wherein the apparatus comprises a motor which is configured to produce a force that acts on the steering movement or a moment that acts on the steering movement, and wherein the apparatus comprises a controller which is configured to carry out the method. The apparatus has advantages that correspond to those of the method. The apparatus can comprise a motor that moves both wheels via a corresponding mechanism. The apparatus can also comprise a motor for each steered wheel, i.e., the wheels have no mechanical connection. The apparatus can comprise a plurality of motors that act on an apparatus in which the two wheels are mechanically connected, or also a plurality of motors that act per steered wheel.

The vehicle comprising the apparatus has advantages that correspond to those of the apparatus.

BRIEF DESCRIPTION OF THE DRAWINGS

Further advantageous embodiments will become apparent from the following description and the drawing. The drawing shows.

4

Figure 3A:
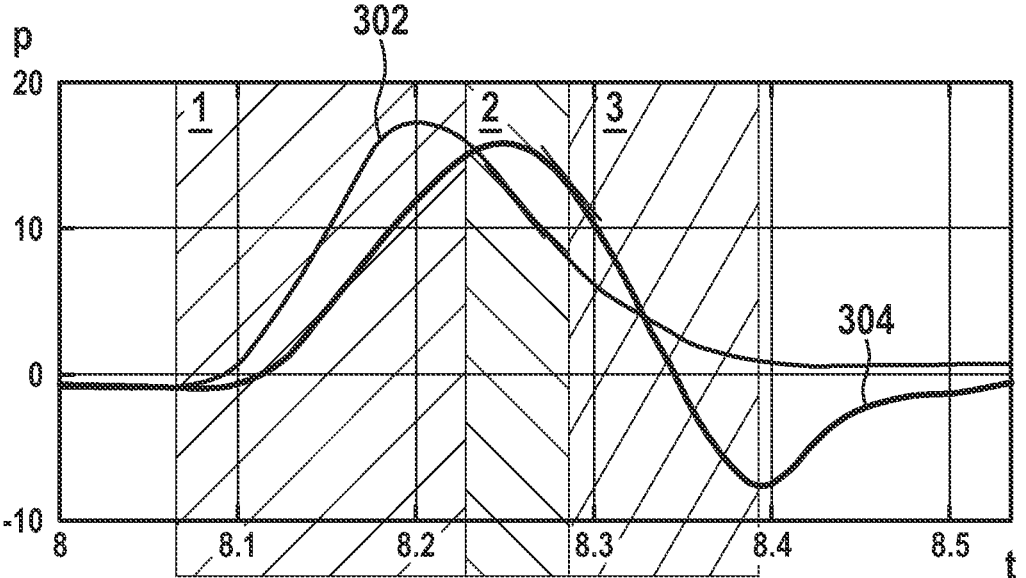
Figure 3B:
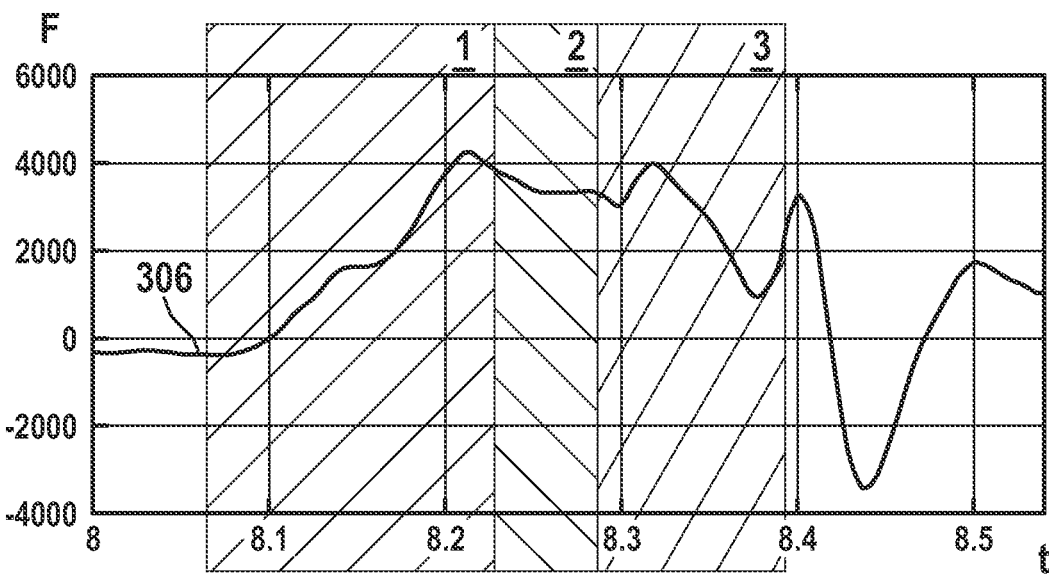
Figure 3C:
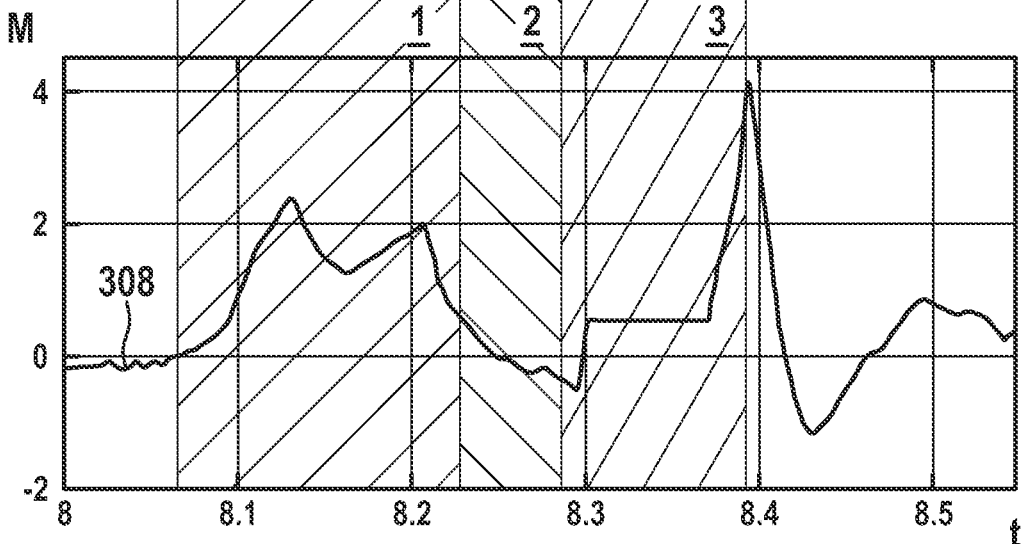
Figure 3D:
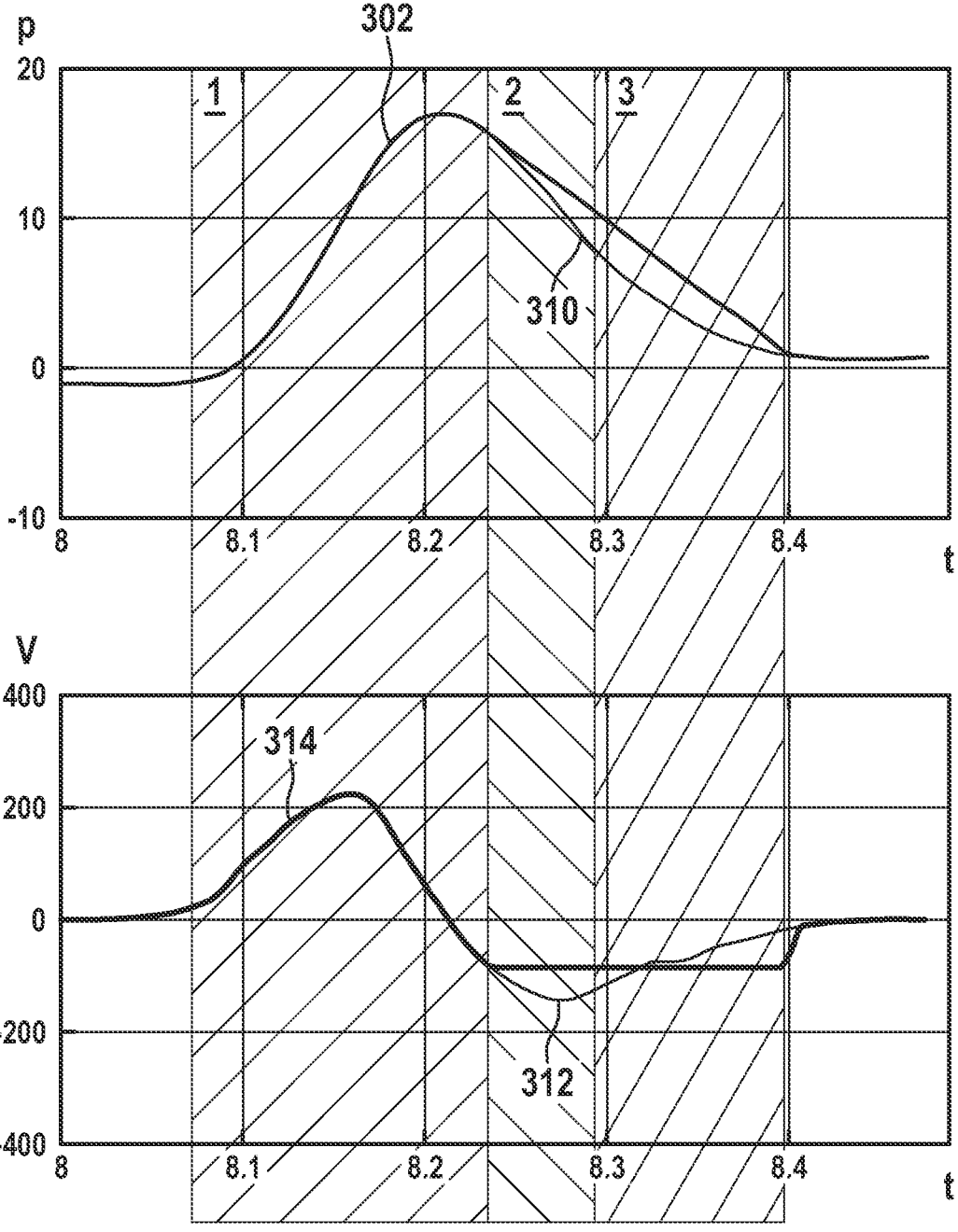
Figure 4:
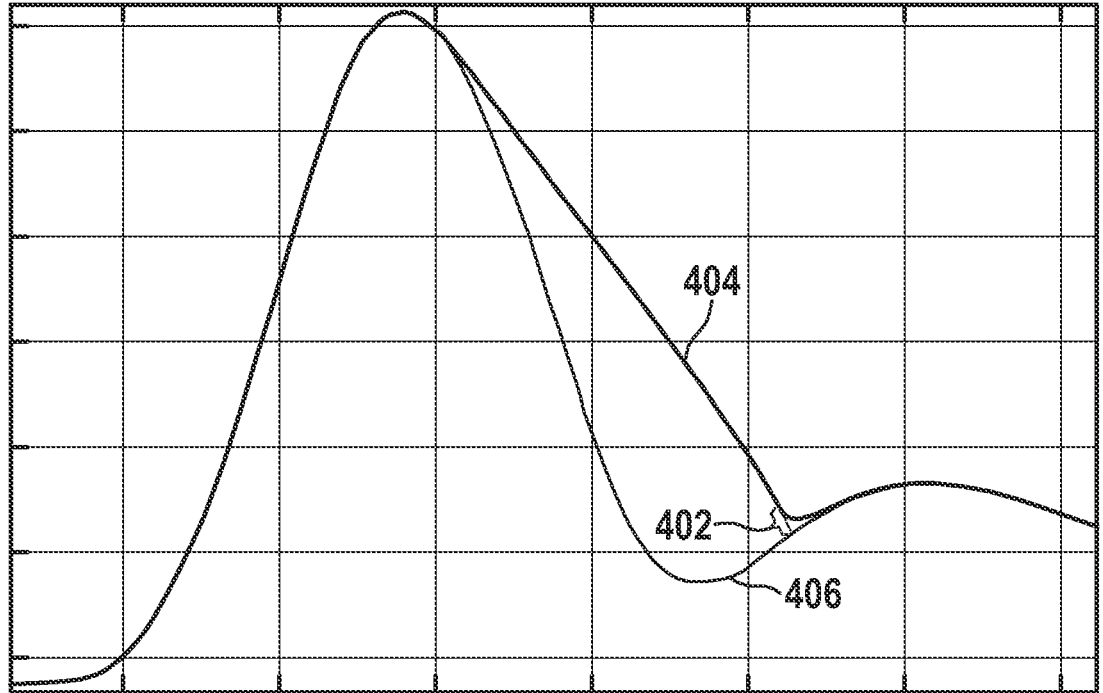

FIG. 3a a temporal progression of a target steering position and a steering position during a steering movement, FIG. 3b a temporal progression of a force acting on the steering movement from outside the active steering system, FIG. 3c a temporal progression of a torque generated by a motor of the active steering system, FIG. 3d a temporal progression of variables in the process, FIG. 4 a section of a transition behavior during a steering movement.

DETAILED DESCRIPTION

Figure 1:
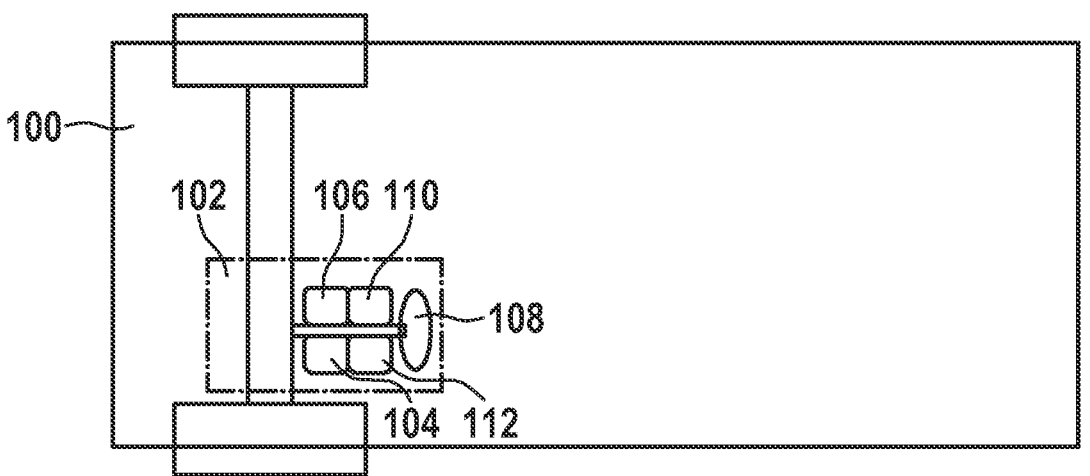
FIG. 1 a schematic illustration of a vehicle.

A vehicle 100 is shown schematically in FIG. 1. The vehicle 100 comprises an apparatus for damping a steering movement of an active steering system 102 of the vehicle.

The apparatus comprises a device 104, which is configured to acquire a variable that characterizes a force acting from outside on a steering movement of the active steering system 102.

The apparatus comprises a motor 106, which is configured to generate a force that acts on the steering movement.

The motor 106 represents a first actuator, which in this example is configured to move at least one wheel of the vehicle 100.

The apparatus comprises a steering device 108, which is configured to acquire a request from a person steering the vehicle.

The apparatus comprises a motor 110, which is configured to move the steering device 108.

The steering device 108 and the motor 110 in this example represent a second actuator.

The first actuator and the second actuator are mechanically decoupled from each other in this example.

In this example, the steering device 108 is a steering wheel that is moved by a moment generated by the person. The steering device 108 can also include another control unit. The control unit can be configured as a joystick, for instance.

In this example, a target steering position is specified by the steering device 108. The target steering position is a target rack position of a rack of an SbW system, for example. The steering device 108 can be configured to receive the target steering position from a function for fully automated driving instead of from the person.

It can be provided that the steering device 108 specifies a target steering angle instead of the target steering position. In a single-wheel steering system, it can be provided that the steering device 108 specifies a wheel steering angle for each steered wheel instead of the target steering position or the target steering angle for the rack.

The apparatus comprises a controller 112, which is configured to carry out a method for damping the steering movement described in the following.

The method is described as an example for the SbW system with an SRA as the central controller, i.e., first actuator. The method can be used for an EPS system or for a system with other actuators, e.g., actuators to steer wheels individually, as well.

In the case of single-wheel steering, single wheel controllers can be provided, in which case, since the forces are different, the steps in the method relate to each wheel individually.

Figure 2:
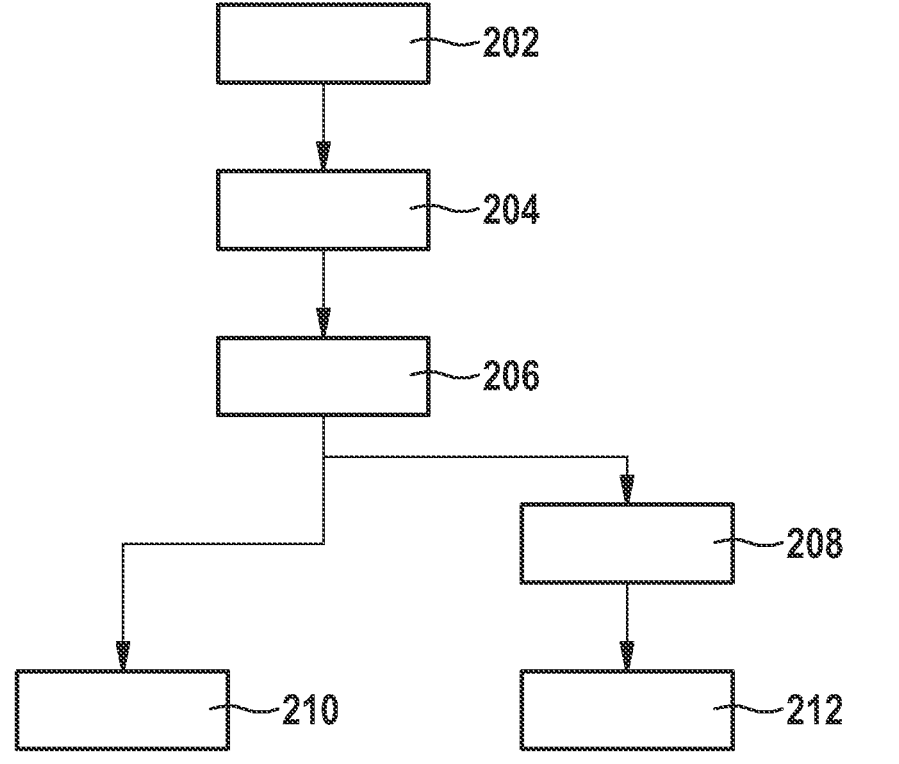
FIG. 2 a flow chart comprising steps in a method for damping a steering movement of an active steering system of the vehicle.

FIG. 2 shows a flow chart with the steps in the method.

In a step 202, the variable that characterizes the force acting from outside the vehicle 100 on the steering movement of the active steering system 102 is determined.

To optimize damping, scaling of the variable that characterizes the force acting from outside can be provided. In a nominal case without scaling, for example, the scaling is 1.

The scaling of the variable that characterizes the force acting from outside is carried out as a function of a motor power, a vehicle speed, a vehicle lateral acceleration, and/or the driving situation, for example.

The scaling includes changing the variable with decreasing motor power, decreasing vehicle speed, or decreasing vehicle lateral acceleration, for example.

Scaling is carried out using a characteristic curve, for example, as a function of the motor power, the vehicle speed, or the vehicle lateral acceleration.

It can be provided that the scaling is set to 1 if the vehicle acceleration or the vehicle lateral acceleration or the variable on which scaling is carried out is unavailable.

If the variable that characterizes the force acting from outside increases in magnitude, for instance, scaling includes maintaining said variable.

If the variable that characterizes the force acting from outside decreases in magnitude, for instance, scaling includes limiting the variable.

In a step 204, a variable that characterizes a steering movement of the steering system 102 is determined.

For example, a variable is determined that characterizes a force which is generated by the motor 106 of the active steering system 102 and acts on the steering movement of the active steering system 102.

In a step 206, it is checked whether the force that acts from outside the vehicle 100 on the steering movement of the active steering system 102 has an accelerating effect on the steering movement of the steering system 102.

Depending on the variables, for example, it is checked whether any one of the following driving situations is being identified:

a driving situation in which the force generated by the motor exceeds a threshold, a driving situation in which the force acting from outside the vehicle exceeds a threshold.

Depending on the variable, it is also checked whether the force generated by the motor 106 and the force acting from outside the vehicle 100 in the identified driving situation initially support the steering movement, after which the force generated by the motor 106 counteracts the steering movement and the force acting from outside the vehicle 100 supports the steering movement.

When this driving situation is identified, a step 208 is carried out. Otherwise, a step 210 is carried out.

In step 208, a limitation of the speed of the steering movement in the driving situation is carried out. Step 208 is described for a target steering position request. For a target steering angle request, step 208 is carried out accordingly.

For example, a maximum change of the target steering position request is specified. Limiting the speed of the steering movement includes limiting the target steering position request to said maximum change, for instance.

The maximum change in the request is ascertained on the basis of the force acting from outside, for example, wherein it is provided that the maximum change is reduced as the force increases. The relationship can furthermore be modified based on the vehicle speed, the lateral acceleration, the driving situation, and/or a motor power.

The target steering position request or the target steering angle request is determined as a function of an angle specified by a person via a movement of a steering device 108, for instance.

To prevent jumps in the limited target steering position request, a distance of the target steering position request limited to the maximum change from an unlimited target steering position request can be determined. To prevent jumps in the limited target steering angle request, a distance of the target steering angle request limited to the maximum change from an unlimited target steering angle request can be determined.

For example, it is determined whether the distance is less than a threshold or not. If it is determined that the distance is less than the threshold, for instance, it is provided that limiting the speed of the steering movement includes limiting to a change that is different than the maximum change instead of limiting to the maximum change, so that the limited requirement conforms to the unlimited requirement.

In one embodiment, limiting the variable that characterizes the force acting from outside includes limiting the variable with a first maximum change when the variable that characterizes the force acting from outside is greater than a threshold, in particular 750 N.

In one embodiment, limiting the variable includes limiting the variable with a second maximum change when the variable that characterizes the force acting from outside is less than or equal to the threshold.

In step 210, there is no limitation of the speed of the steering movement based on this method. It is not excluded that a limitation of the speed of the steering movement is provided based on other methods or functions.

After step 208, a step 212 can optionally be provided.

In step 212, feedback is provided on the control element that a steering speed should be reduced.

Feedback that the steering speed should be reduced is provided to the person, for example by a counter-moment which counteracts the movement of the steering device by the person. This is generated by the motor 110, for instance. This is output via the steering device, for example. The counter-moment is calculated taking into account the ascertained maximum change of the specification, for example.

In one embodiment, the variable that characterizes the force acting from outside is a force that acts on a tie rod of the active steering system.

In one embodiment, the variable that characterizes the force generated by the motor 106 is a torque of the motor 106.

FIG. 3a shows a temporal progression of the target steering position 302 and a steering position 304 during an example of a steering movement. In this example, the progression of the target steering position 302 and the progression of the steering position 304 start at a first time in a first position.

In this example, the target steering position 302 specifies a target steering position 302 that increases from the first position to a second position from a second point in time (8.1) to a third point in time. In this example, this corresponds to a very strong left curve. After the third point in time (8.2), a target steering position 302 is then specified which decreases from the second position.

In this example, the steering position 304 follows the target steering position 302 in a phase 1 with a phase delay and reaches a first steering position at a fourth point in time. The steering position 304 subsequently drops to a second steering position at a fifth point in time and then rises to a third steering position.

In a phase 2 between a sixth point in time and a seventh point in time, the target steering position 302 exhibits a gradient that is so large that field weakening occurs in the motor 106 due to the high rotational speed, as a result of which the motor 106 can no longer generate a sufficiently high torque to damp the steering movement. In a phase 3 between an eighth point in time and a ninth point in time, the steering position 304 is therefore determined by the force acting from outside.

FIG. 3*b* shows a temporal progression of this force 306 acting on the steering movement from outside the active steering system between a first force and a second force in phases 1, 2, and 3.

FIG. 3*c* shows a temporal progression of this torque 308 generated by the motor 106 between a first torque and a second torque in phases 1, 2, and 3.

At the end of phase 1, the driving situation in which damping is required is identified in the method in this example. This allows the motor 106 to set a progression in phases 2 and 3 that differs from the progression shown in FIG. 3*a-c*.

The upper part of FIG. 3*d* shows a temporal progression of the unlimited target steering position 302 and a target steering position request 310 that is limited with the method to the maximum change in phases 1, 2, and 3. The lower part of FIG. 3*d* shows a corresponding progression of an unlimited steering speed 312 of a tie rod of the active steering system 102 and a steering speed 314 between a first steering speed and a second steering speed resulting from the method.

FIG. 4 shows a section of an example of a transition behavior for preventing a jump during a steering movement.

To prevent the jump, a distance 402 of the target steering position request 404 limited to the maximum change from an unlimited target steering position request 406 is determined. If the distance 402 is less than the threshold, the limited target steering position request 404 is aligned with the unlimited target steering position request 406.

This provides a progression of the resulting target steering position that can actually be set by the motor 106.

What is claimed is:

1. A method for damping a steering movement in an active steering system of a vehicle, comprising:
   determining a variable which characterizes at least one of
      (i) a force acting from outside the vehicle on the steering movement of the active steering system that has an accelerating effect on the steering movement of the steering system, and (ii) a moment acting from outside the vehicle on the steering movement of the active steering system that has an accelerating effect on the steering movement of the steering system; and
   limiting the speed of the steering movement as a function of the variable.

2. The method according to claim 1, further comprising:
   specifying a maximum change of a target steering position request, wherein
   the speed of the steering movement is a function of the target steering position request,
   either limiting the speed of the steering movement includes limiting the target steering position request to the maximum change, or a maximum change of a target steering angle request is specified,
   the speed of the steering movement is a function of the target steering angle request, and
   limiting the speed of the steering movement includes limiting the target steering angle request to the maximum change.

3. The method according to claim 2, wherein:
   limiting the maximum change is carried out on the basis of a scaled or modified force;

either the maximum change decreases as the force increases, or limiting the maximum change is carried out on the basis of a scaled or modified moment; and
the maximum change decreases as the moment increases.

4. The method according to claim 2, further comprising:
   determining either a distance of the target steering position request limited to the maximum change from an unlimited target steering position request, or a distance of the target steering angle request limited to the maximum change from an unlimited target steering angle request; and
   determining that the determined distance is less than a threshold, wherein
   limiting the speed of the steering movement includes limiting to a change that is greater than the maximum change instead of limiting to the maximum change in response to determining that the distance is less than the threshold.

5. The method according to claim 2, wherein:
   the scaling of the variable that characterizes the force acting from outside or the moment acting from outside and/or the maximum change is carried out as a function of a motor power, a vehicle speed, a vehicle lateral acceleration, and/or a driving situation.

6. The method according to claim 5, wherein the scaling includes changing the variable or the maximum change with decreasing motor power, decreasing vehicle speed, or decreasing vehicle lateral acceleration.

7. The method according to claim 5, wherein at least one of:
   scaling includes maintaining the variable that characterizes the force acting from outside or the moment acting from outside when the variable that characterizes the force acting from outside or the moment acting from outside increases in magnitude;
   scaling includes limiting the variable that characterizes the force acting from outside or the moment acting from outside when the variable that characterizes the force acting from outside or the moment acting from outside decreases in magnitude;
   scaling includes maintaining said maximum change when the maximum change increases in magnitude; and
   scaling includes limiting the maximum change when the maximum change decreases in magnitude.

8. The method according to claim 7, wherein limiting the variable that characterizes the force acting from outside or the moment acting from outside provides limiting the variable with a first maximum change when the variable is greater than a threshold and provides limiting the variable with a second maximum change when the variable is less than or equal to the threshold.

9. The method according to claim 2, further comprising:
   identifying a driving situation; and
   providing feedback on a control element that a steering speed should be reduced based upon the identified driving situation.

10. The method according to claim 9, wherein:
   the target steering position request or the target steering angle request is determined as a function of an angle specified by a person via a movement of a steering device; and
   feedback that the steering speed should be reduced is provided to the person by a counter-moment which counteracts said movement and is output via the steering device.

11. An active steering system, comprising:

a device configured to acquire a variable that characterizes a force acting from outside on a steering movement of the active steering system or the moment acting from outside;

a motor configured to produce a force that acts on the steering movement or a moment that acts on the steering movement; and a controller configured to carry out the method according to claim 1.

12. A vehicle comprising the apparatus according to claim 11.

* * * * *